United States Patent
Goto et al.

(10) Patent No.: US 10,845,840 B2
(45) Date of Patent: Nov. 24, 2020

(54) OPERATION FEEL IMPARTING TYPE INPUT DEVICE

(71) Applicant: ALPS ALPINE CO., LTD., Tokyo (JP)

(72) Inventors: Atsushi Goto, Miyagi (JP); Kazunari Takahashi, Miyagi (JP); Ryuichiro Yasuhara, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 141 days.

(21) Appl. No.: 16/275,718

(22) Filed: Feb. 14, 2019

(65) Prior Publication Data
US 2019/0179356 A1   Jun. 13, 2019

Related U.S. Application Data

(63) Continuation of application No. PCT/JP2017/008807, filed on Mar. 6, 2017.

(30) Foreign Application Priority Data

Sep. 16, 2016   (JP) .................................. 2016-182178

(51) Int. Cl.
*F16D 63/00* (2006.01)
*G05G 1/10* (2006.01)
(Continued)

(52) U.S. Cl.
CPC .............. *G05G 5/03* (2013.01); *F16D 57/002* (2013.01); *F16D 63/00* (2013.01); *F16D 66/00* (2013.01);
(Continued)

(58) Field of Classification Search
CPC .. G05G 5/03; G05G 1/10; G05G 1/08; G05G 2505/00; F16D 63/00; F16D 57/002;
(Continued)

(56) References Cited

U.S. PATENT DOCUMENTS 6,710,565 B2   3/2004   Maeda
6,854,573 B2   2/2005   Jolly et al.
(Continued)

FOREIGN PATENT DOCUMENTS

JP   2003-050639   2/2003
JP   2005-019113   1/2005
(Continued)

OTHER PUBLICATIONS

International Search Report dated May 16, 2017 in PCT/JP2017/008807 filed on Mar. 6, 2017.

*Primary Examiner* — David J Hlavka
(74) *Attorney, Agent, or Firm* — IPUSA, PLLC

(57) ABSTRACT

An operation feel imparting type input device includes a fixed part, a rotating body rotatably supported by the fixed part, a rotatable operation knob fixed to the rotating body, a rotation angle detection unit configured to detect a rotation angle of the rotating body, a brake application unit configured to apply a braking force to the rotating body, a torque application unit configured to apply a torque to the rotating body, a control unit configured to control the brake application unit and the torque application unit, and an operation torque detection unit configured to detect the magnitude of an operation torque applied to the rotating body. When the rotating body is rotated from an endstop, brake release is performed according to the magnitude of the operation torque.

7 Claims, 8 Drawing Sheets

(51) Int. Cl.
  *G05G 5/03* (2008.04)
  *F16F 9/53* (2006.01)
  *H01H 3/52* (2006.01)
  *F16D 57/00* (2006.01)
  *F16D 66/00* (2006.01)
  *G05G 1/08* (2006.01)
(52) U.S. Cl.
  CPC ............... *F16F 9/53* (2013.01); *F16F 9/535* (2013.01); *G05G 1/10* (2013.01); *H01H 3/52* (2013.01); *F16D 2066/003* (2013.01); *F16D 2066/005* (2013.01); *G05G 1/08* (2013.01); *G05G 2505/00* (2013.01)
(58) Field of Classification Search
  CPC ............... F16D 66/00; F16D 2066/005; F16D 2066/003; F16F 9/53; F16F 9/535; H01H 3/52
  See application file for complete search history.

(56) References Cited

U.S. PATENT DOCUMENTS

| | | | |
|---|---|---|---|
| 2004/0231434 A1 | 11/2004 | Shibazaki et al. | |
| 2011/0128135 A1* | 6/2011 | Periquet | B60K 37/06 340/407.2 |
| 2011/0181405 A1 | 7/2011 | Periquet et al. | |
| 2012/0056761 A1* | 3/2012 | Sano | G05G 1/08 341/35 |
| 2013/0199881 A1* | 8/2013 | Sano | F16D 65/186 188/267 |
| 2013/0220060 A1* | 8/2013 | Sano | G05G 5/03 74/504 |
| 2016/0378131 A1* | 12/2016 | Battlogg | F16H 59/0217 74/553 |
| 2017/0261097 A1* | 9/2017 | Yamanaka | B60K 20/02 |
| 2018/0233302 A1* | 8/2018 | Arakawa | B60K 37/06 |
| 2018/0239385 A1* | 8/2018 | Mizukami | F16H 59/08 |
| 2018/0372216 A1* | 12/2018 | Yamanaka | G05G 5/03 |

FOREIGN PATENT DOCUMENTS

| | | |
|---|---|---|
| JP | 2005-507061 | 3/2005 |
| JP | 2010-211270 | 9/2010 |
| JP | 2011-519098 | 6/2011 |

\* cited by examiner

BRAKING FORCE

ROTATIONAL TORQUE

OPERATION FEEL IMPARTING TYPE INPUT DEVICE

CROSS-REFERENCE TO RELATED APPLICATIONS

The present application is a continuation application filed under 35 U.S.C. 111(a) claiming benefit under 35 U.S.C. 120 and 365 (c) of PCT International Application No. PCT/JP2017/008807 filed on Mar. 6, 2017 and designating the U.S., which claims priority to Japanese Patent Application No. 2016-182178 filed on Sep. 16, 2016. The entire contents of the foregoing applications are incorporated herein by reference.

BACKGROUND OF THE INVENTION

1. Field of the Invention

The present invention relates to an operation feel imparting type input device, and particularly to an operation feel imparting type input device that is capable of generating a resistance torque in the opposite direction of an operating direction and a pulling torque in the same direction as the operating direction.

2. Description of the Related Art

Japanese Unexamined Patent Publication No. 2005-507061 describes an invention relating to a brake including a magnetic field responsive material. This brake has a shaft that is rotatably supported in a housing, and a rotor that is configured to rotate with the shaft and is arranged in a first chamber of the housing. A magnetic field responsive material and a magnetic field generator are provided in the first chamber. The magnetic field responsive material changes its fluidity depending on the intensity of the magnetic field. When the magnetic field generator does not generate a magnetic field, the viscosity or the shear flow resistance of the magnetic field responsive material decreases such that the shaft and the rotor can be easily rotated. When a magnetic field is generated by the magnetic field generator, the viscosity or the shear flow resistance of the magnetic field responsive material increases such a braking force is applied to the shaft and the rotor.

Japanese Unexamined Patent Publication No. 2003-50639 describes an invention relating to a manual input device. This manual input device includes an operating member, a carrier shaft that rotates together with the operating member, and an encoder provided on an output shaft of the motor. A carrier is fixed to the carrier shaft, and a plurality of planet gears are rotatably supported on the carrier. A sun gear is fixed to the output shaft of the motor, and the planet gears mesh with the periphery of the sun gear. When the operating member is manually operated and rotated so that the encoder is operated, rotational forces in the same direction as the operating direction and the opposite direction are imparted from the motor to the carrier shaft such that a resistive feel and an acceleration feel can be imparted to the hand operating the operating member.

Although the brake described in Japanese Unexamined Patent Publication No. 2005-507061 can apply a braking force to the rotor by the action of the magnetic field responsive material, it cannot apply a rotational force to the rotor. As such, imparting various types of operation feels to the operator has been difficult.

The manual input device described in Japanese Unexamined Patent Publication No. 2003-50639 can impart a resistive feel and an acceleration feel to a hand operating the operating member by imparting the power of the motor to the carrier shaft. However, in order to suitably impart a resistive feel and an acceleration feel to the operator, control of the motor becomes complicated, and unnecessary vibrations may occur as a result of switching the rotation direction of the motor. Also, when changing the rotation direction to the opposite direction from a previous operating direction during operation, for example, the rotation direction cannot be promptly changed when transitioning from an endstop state and a catching feel may be felt.

SUMMARY OF THE INVENTION

One aspect of the present invention is directed to providing an operation feel imparting type input device that is capable of suitably imparting a resistive feel and a pulling feel to a rotating body, while preventing the rotating body from generating a catching feel when the rotating body transitions from an endstop state.

According to one embodiment of the present invention, an operation feel imparting type input device is provided that includes a fixed part, a rotating body rotatably supported by the fixed part, a rotatable operation knob fixed to the rotating body, a rotation angle detection unit configured to detect a rotation angle of the rotating body, a brake application unit configured to apply a braking force to the rotating body, a torque application unit configured to apply a torque to the rotating body, a control unit configured to control the brake application unit and the torque application unit, and an operation torque detection unit configured to detect the magnitude of an operation torque applied to the rotating body. When the rotating body is rotated from an endstop, brake release is performed according to the magnitude of the operation torque.

DESCRIPTION OF THE EMBODIMENTS

Figure 1:
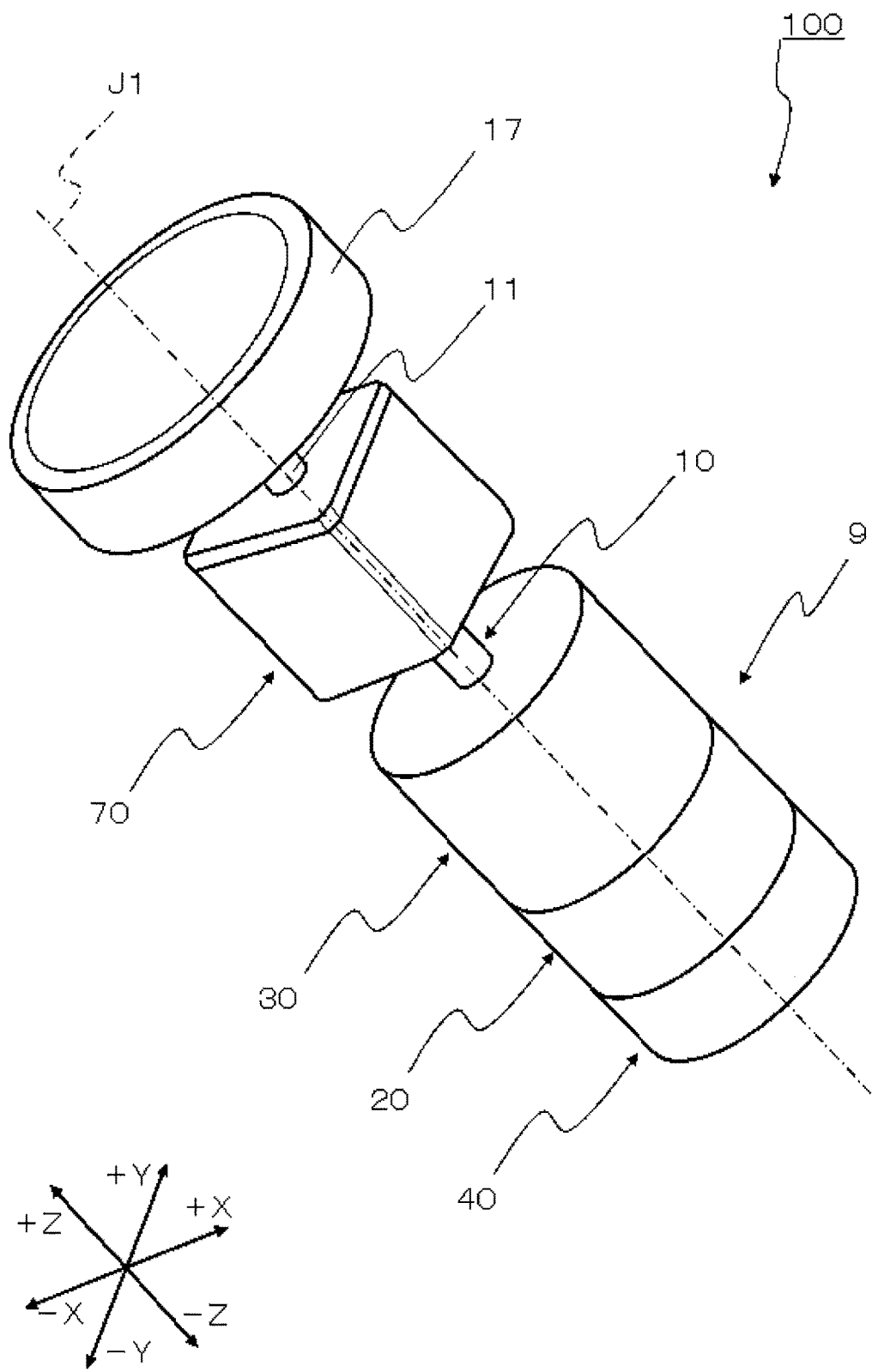
FIG. 1 is a perspective view of an operation feel imparting type input device according to an embodiment of the present invention.

In the following, embodiments of the present invention will be described with reference to the accompanying drawings. An operation feel imparting type input device 100 according to an embodiment of the present invention is a rotary input device that is capable of switching between a plurality of operation feels to be imparted to an operator operating an operation knob using software. The operation feel imparting type input device 100 may be used in an electronic device such as an on-vehicle electronic device, for example. Note that applications of the operation feel imparting type input device 100 according to the present invention are not limited to the embodiment described below and various changes may be made as appropriate. In the following descriptions with respect to the drawings, for the sake of convenience, relative directions may sometimes be referred to as right side, left side, upper side, and lower side, but these directional terms respectively refer to +X side, −X side, +Z side, and −Z side in the drawings. Note, however, that the installation direction of the product and the direction of the product during use are not limited to these directions.

Figure 2:
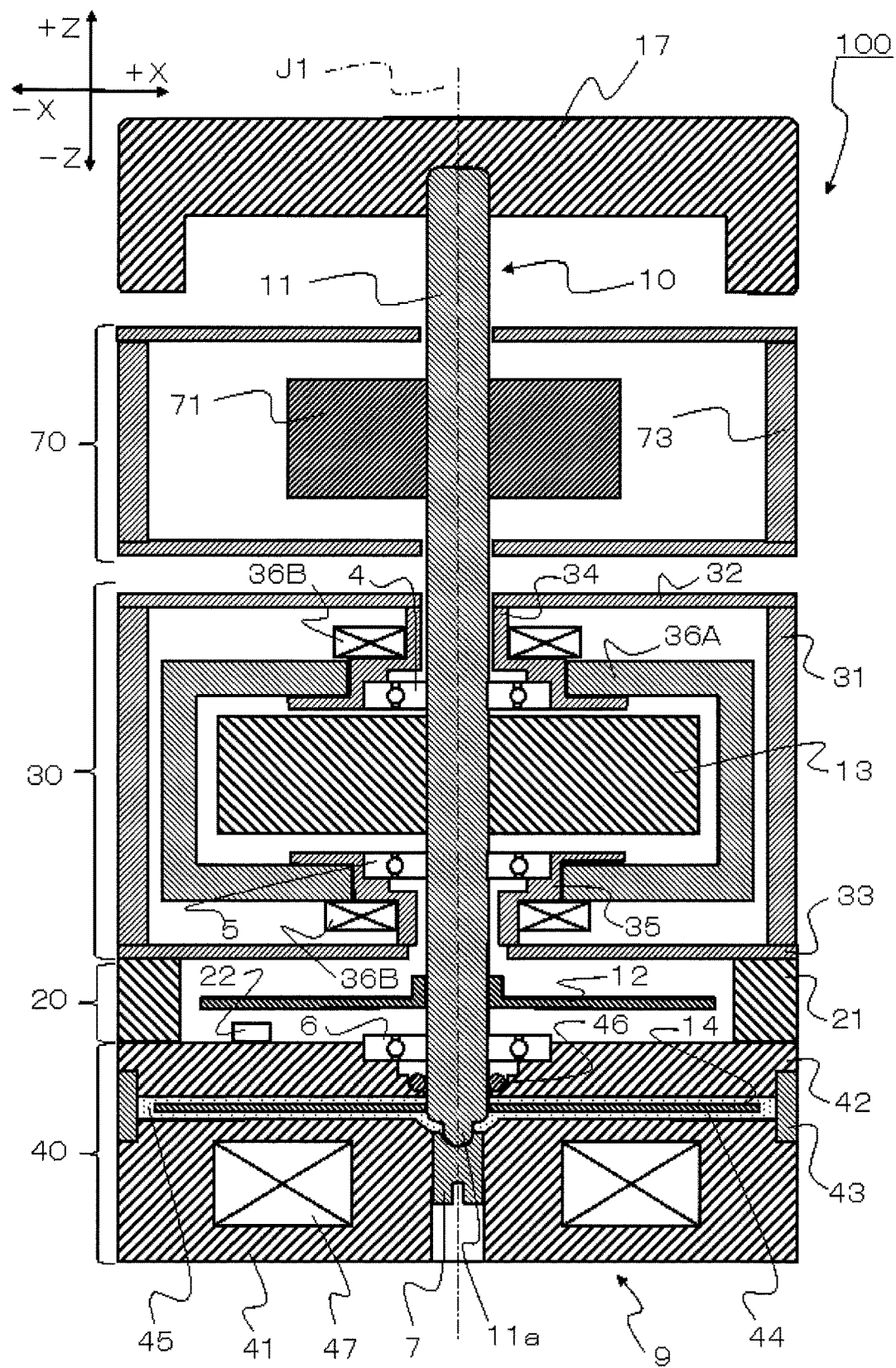
FIG. 2 is a cross-sectional view of an overall structure of the operation feel imparting type input device.
Figure 3:
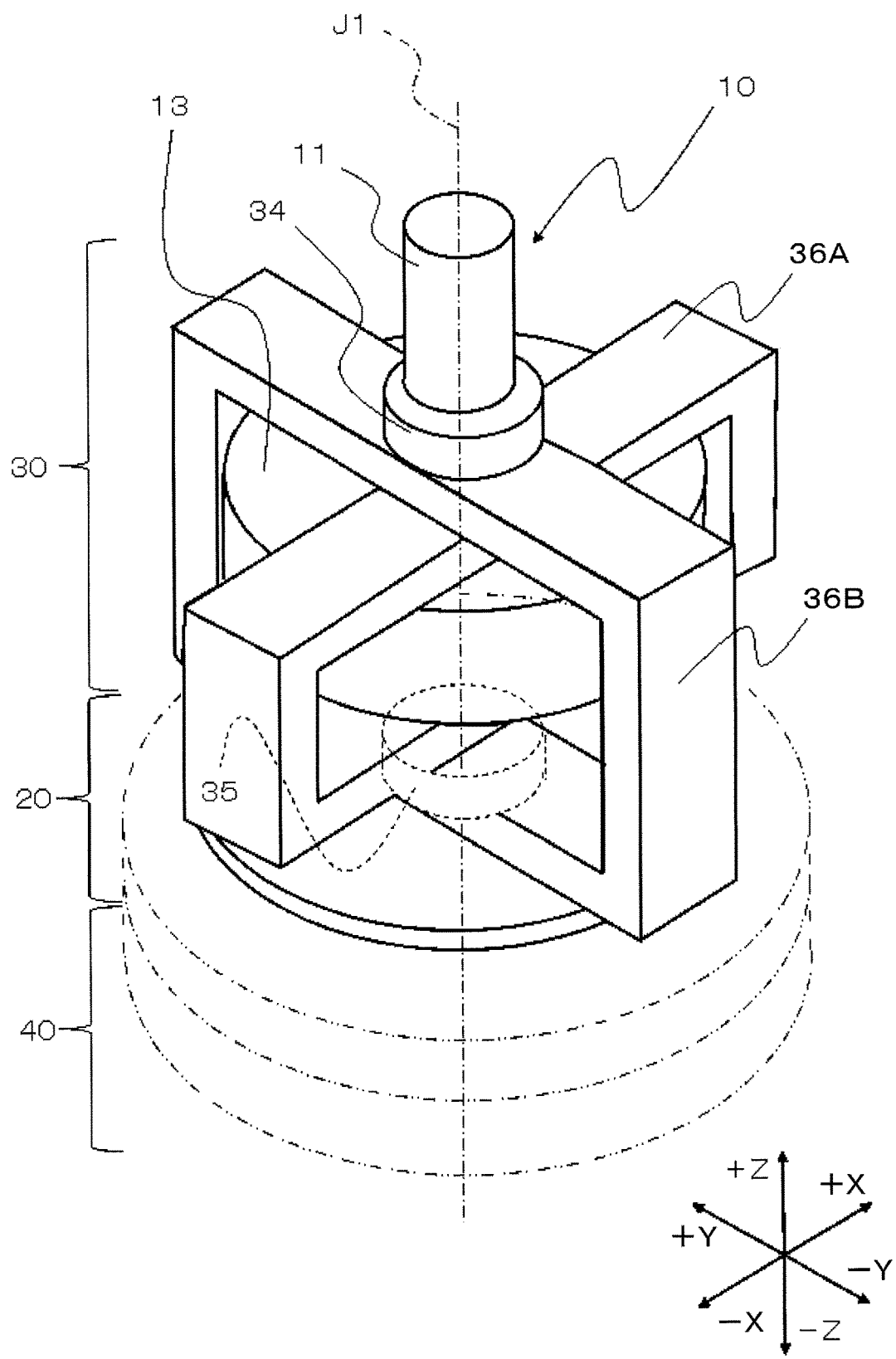
FIG. 3 is a perspective view of a main part of the operation feel imparting type input device.
Figure 4:
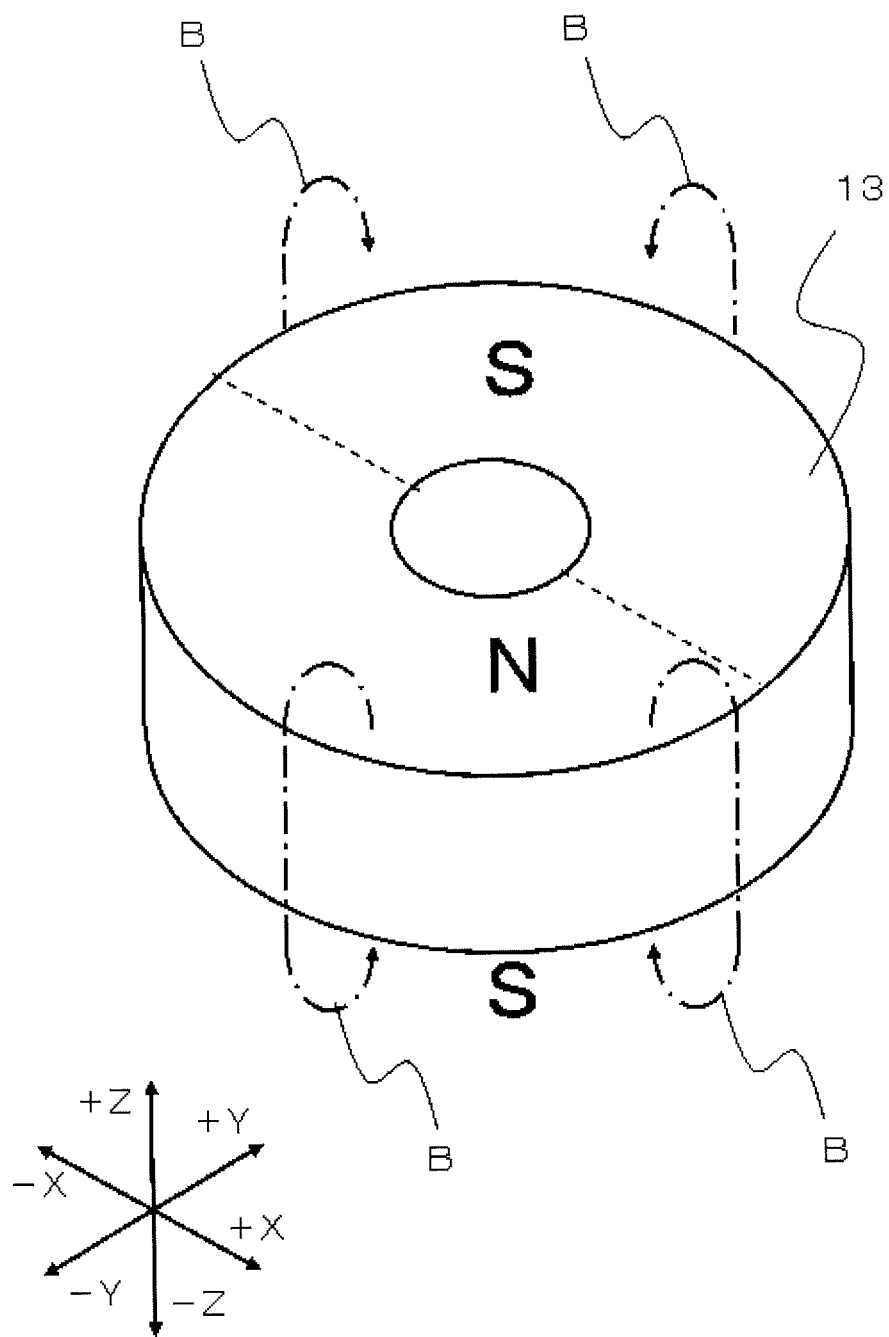
FIG. 4 is a perspective view of a rotor provided in the operation feel imparting type input device.
Figure 5:
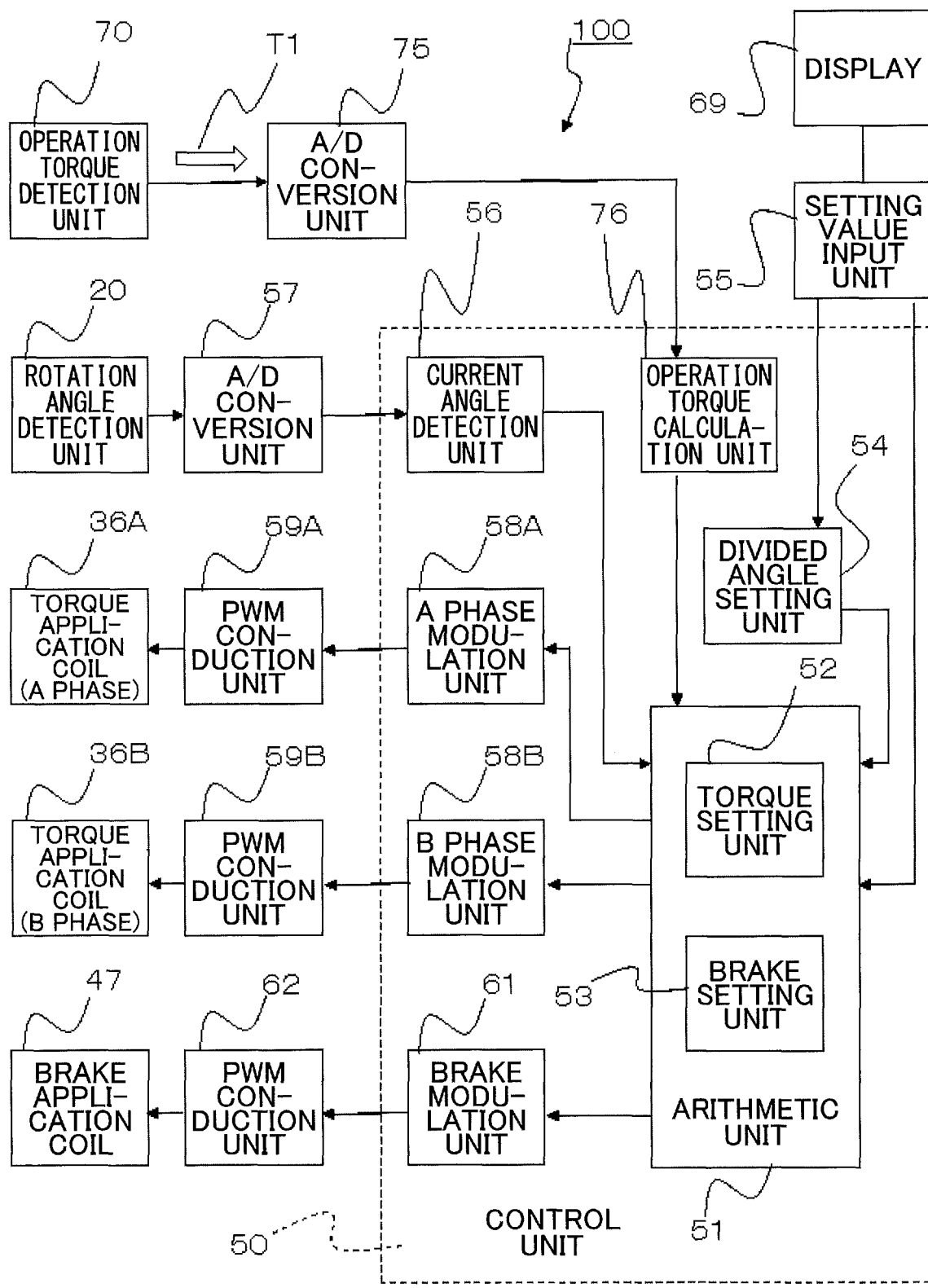
FIG. 5 is a block diagram showing a circuit configuration of the operation feel imparting type input device.

First, the overall structure and circuit configuration of the operation feel imparting type input device 100 will be described with reference to FIGS. 1 to 5. FIG. 1 is an external perspective view of the operation feel imparting type input device 100, FIG. 2 is a cross-sectional view showing the overall structure of the operation feel imparting type input device 100, and FIG. 3 is a perspective view showing a main part of the operation feel imparting type input device 100. FIG. 4 is a perspective view showing a rotor 13 provided in the operation feel imparting type input device 100, and FIG. 5 is a block diagram showing a circuit configuration of the operation feel imparting type input device 100.

As shown in FIG. 1, the operation feel imparting type input device 100 includes a fixed part 9, a rotating body 10 that is rotatably supported by the fixed part 9, and a rotatable operation knob 17 that is fixed to the rotating body 10.

The rotating body 10 includes an operation shaft 11 and is configured to rotate around a rotational center line J1. As shown in FIG. 2, the rotating body 10 has a detection plate 12, a rotor 13, a rotating plate 14, and a torque sensor 71 fixed to the operation shaft 11. The detection plate 12, the rotor 13, the rotating plate 14, and the torque sensor 71 are attached to the operation shaft 11 so that their laterally extending surfaces are perpendicular to the rotational center line J1. A pivot portion 11a is formed at the lower end of the operation shaft 11.

As shown in FIG. 2, the operation feel imparting type input device 100 includes a rotation angle detection unit 20 that detects the rotation angle of the rotating body 10, a brake application unit 40 that applies a braking force to the rotating body 10, a torque application unit 30 that applies torque to the rotating body 10, a control unit 50 (see FIG. 5) that controls the brake application unit 40 and the torque application unit 30, and an operation torque detection unit 70 that detects the magnitude of an operation torque applied to the rotating body 10. Note that the rotation angle detection unit 20, the brake application unit 40, the torque application unit 30, and the operation torque detection unit 70 are formed across both the fixed part 9 and the rotating body 10. Further, although not shown in FIG. 2, the control unit 50 is formed in the fixed part 9.

The fixed part 9 includes a lower yoke 41, an upper yoke 42, and a spacer ring 43 that constitute a part of the brake application unit 40; an intermediate housing 21 that constitutes a part of the rotation angle detection unit 20; an upper housing 31, an upper support plate 32, and a lower support plate 33 that constitute a part of the torque application unit 30; and a torque sensor housing 73 that constitutes a part of the operation torque detection unit 70. The above components form a housing for the entire operation feel imparting type input device 100.

Also, a plurality of radial bearings 4, 5, and 6 are provided inside the fixed part 9, and the operation shaft 11 is rotatably supported by these radial bearings 4, 5, and 6. A thrust bearing 7 is provided at a lower portion of the fixed part 9, and the pivot portion 11a formed at the lower end of the operation shaft 11 is supported by the thrust bearing 7.

In the rotation angle detection unit 20, the above-described detection plate 12 is provided within an internal space of the intermediate housing 21 constituting a part of the fixed part 9. A rotation detection element 22 facing the detection plate 12 is fixed to the fixed part 9, and in this way, a non-contact type rotation detection device for detecting the rotation angle of the rotating body 10 is configured.

The rotation detection element 22 may be an optical detector or a magnetic detector. In the case where an optical detector is used, a reflecting portion and a non-reflecting portion may be alternately formed on the detection plate 12 along a circumferential direction with the rotational center line J1 as the center. Alternatively, a light-transmitting portion and a non-light-transmitting portion may be alternately formed. In the case where a magnetic detector is used, the detection plate 12 includes a magnet. In either case, the rotational angle detection unit 20 detects the rotational angle of the rotating body 10.

In the torque application unit 30, the upper support plate 32 and the lower support plate 33 are fixed to the upper housing 31 constituting a part of the fixed part 9. An upper coil support body 34 is fixed to the upper support plate 32, and a lower coil support body 35 is fixed to the lower support plate 33. The above-described radial bearing 4 is fixed to the upper coil support body 34 and the above-described radial bearing 5 is fixed to the lower coil support body 35.

An A phase torque application coil 36A and a B phase torque application coil 36B are fixed to the upper coil support body 34 and the lower coil support body 35. As shown in FIG. 3, the A phase torque application coil 36A and the B phase torque application coil 36B have conductive wires taking multiple turns to be wound around into rectangular shapes such that the conductive wires can avoid the upper coil support body 34 and the lower coil support body 35. Control currents of different phases are supplied to the A phase torque application coil 36A and the B phase torque application coil 36B. The A phase torque application coil 36A and the B phase torque application coil 36B are arranged to intersect with each other at right angles in planar view.

The rotor 13 is a magnet and has a cylindrical shape as shown in FIG. 4. The rotor has a magnetized region that is divided into two by a 180-degree boundary. One of the magnetized regions has an upper surface magnetized to the N pole and a lower surface magnetized to the S pole, and the other one of the magnetized regions has an upper surface magnetized to the S pole and a lower surface magnetized to the N pole. A magnetic flux B emitted from the two magnetized regions of the rotor 13 traverses the A phase torque application coil 36A and the B phase torque application coil 36B.

As shown in FIG. 2, the brake application unit 40 is configured by combining the lower yoke 41 and the upper yoke 42. The lower yoke 41 and the upper yoke 42 are made of a soft magnetic material such as a Ni—Fe alloy.

The spacer ring 43 made of a metal plate is attached to the outer peripheries of the lower yoke 41 and the upper yoke 42. The spacer ring 43 determines the relative positions of the lower yoke 41 and the upper yoke 42 in the vertical direction and maintains a gap 44 between the lower yoke 41 and the upper yoke 42 in the vertical direction to be uniform. Further, the spacer ring 43 closes the gap 44 from the outer peripheral side. The lower yoke 41 and the upper yoke 42 are fixed to each other using an outer case (not shown) or the like while the relative positions of the lower yoke 41 and the upper yoke 42 are determined by the spacer ring 43.

When the lower yoke 41 and the upper yoke 42 are assembled, the above-described rotating plate 14 of the rotating body 10 is accommodated in the gap 44. Also, a magnetorheological fluid 45 is filled into the space between the upper surface of the lower yoke 41 and the rotating plate 14 and the space between the lower surface of the upper yoke 42 and the rotating plate 14. The magnetorheological fluid 45 is a mixture of an oil agent such as silicone oil and magnetic powder or magnetic particles such as Ni—Fe alloy powder.

As shown in FIG. 2, the above-described radial bearing 6 is fixed to the upper side of the upper yoke 42, and the above-described thrust bearing 7 is fixed to the center of the lower yoke 41. Further, an O-ring 46 is interposed between the upper yoke 42 and the operation shaft 11 at a position between the gap 44 and the radial bearing 6. The O-ring 46 prevents the magnetorheological fluid 45 in the gap 44 from flowing out toward the radial bearing 6.

As shown in FIG. 2, a brake application coil 47 as a magnetic field generation unit is provided inside the lower yoke 41. The brake application coil 47 is configured by a conductive wire wound multiple times in the circumferential direction around the rotational center line J1.

In the operation torque detection unit 70, the above-described torque sensor 71 is provided in the internal space of the torque sensor housing 73 constituting a part of the fixed part 9. The torque sensor 71 can detect an operation torque T1 applied to the hand of an operator when the operator manually rotates the operation knob 17 attached to the rotating body 10.

As described above, the operation feel imparting type input device 100 includes the control unit 50. The control unit 50 is mainly configured by a CPU and a memory. The control unit 50 implements various processes based on one or more programs read from the memory (not shown). Note that FIG. 5 includes a block diagram showing processing units that implement the various processes executed by the control unit 50.

The control unit 50 includes an arithmetic unit 51, which includes a torque setting unit 52 and a brake setting unit 53. The control unit 50 also includes a divided angle setting unit 54. Also, the operation feel imparting type input device 100 includes a setting value input unit 55, which includes an input device (not shown) such as a keyboard, and the setting value input unit 55 is connected to a display 69. Setting values may be input to the arithmetic unit 51 and the divided angle setting unit 54 by operating the setting value input unit 55.

The control unit 50 also includes a current angle detection unit 56. A detection output from the rotation detection element 22 arranged in the rotation angle detection unit 20 is converted into a digital value by an A/D conversion unit 57, the resulting digital value is input to the current angle detection unit 56, and a resulting output of the current angle detection unit 56 is input to the arithmetic unit 51.

The control unit 50 also includes an A phase modulation unit 58A and a B phase modulation unit 58B. A pulse-width modulation (PWM) conduction unit 59A is controlled by the A phase modulation unit 58A in accordance with an arithmetic result of the arithmetic unit 51, and a control current with a duty ratio corresponding to the control value is supplied to the A phase torque application coil 36A. Similarly, a PWM conduction unit 59B is controlled by the B phase modulation unit 58B in accordance with an arithmetic result of the arithmetic unit 51, and a control current with a duty ratio corresponding to the control value is supplied to the B phase torque application coil 36B.

The control unit 50 also includes a brake modulation unit 61. A PWM conduction unit 62 is controlled by the brake modulation unit 61 in accordance with an arithmetic result of the arithmetic unit 51, and a control current with a duty ratio corresponding to the control value is supplied to the brake application coil 47.

As described above, the brake application unit 40 is configured by the rotating plate 14 of the rotating body 10, the magnetorheological fluid 45 arranged in the gap 44 between the fixed part 9 and the rotating plate 14, and the brake application coil 47 that applies a magnetic field to the magnetorheological fluid 45. Brake control such as brake release is performed by controlling the current supplied to the brake application coil 47. By using the magnetorheological fluid 45 for brake control, a natural operation feel can be imparted to the operator.

The control unit 50 also includes an operation torque calculation unit 76. A detection output (operation torque T1) from the torque sensor 71 included in the operation torque detection unit 70 is converted into a digital value by an A/D conversion unit 75, and the digital value is supplied to the operation torque calculation unit 76, which in turn calculates the value of the operation torque T1. The calculated value of the operation torque T1 is input to the arithmetic unit 51.

Figure 6A:
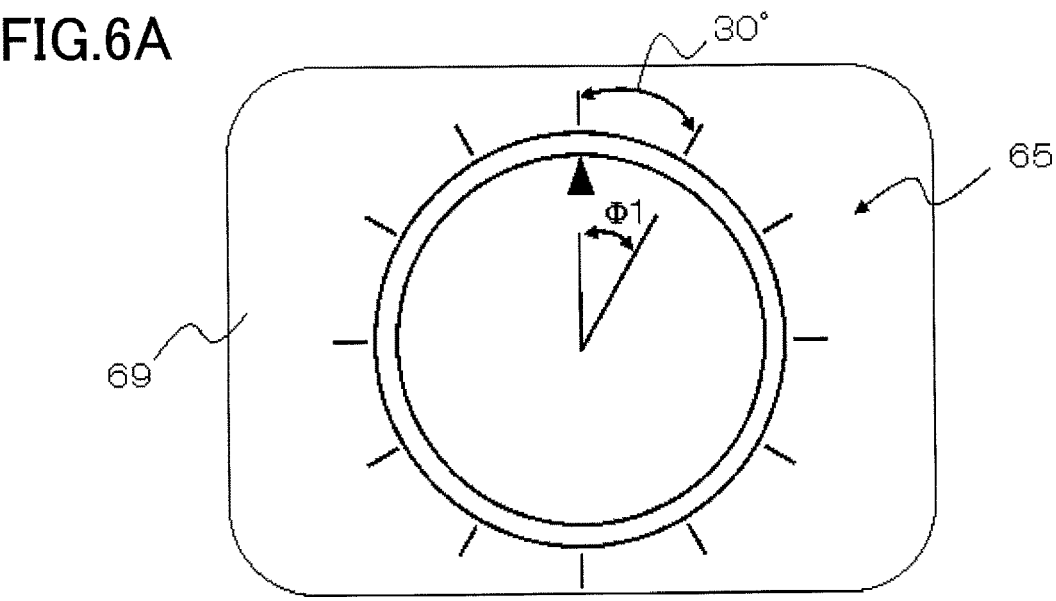
FIGS. 6A-6C are diagrams showing setting operations for setting up a braking force and a rotational torque.
Figure 6B:
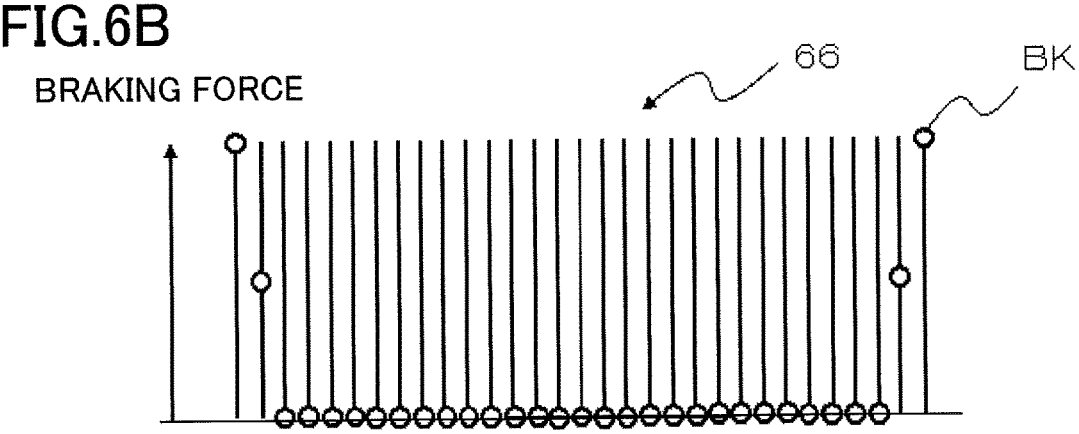
Figure 6C:
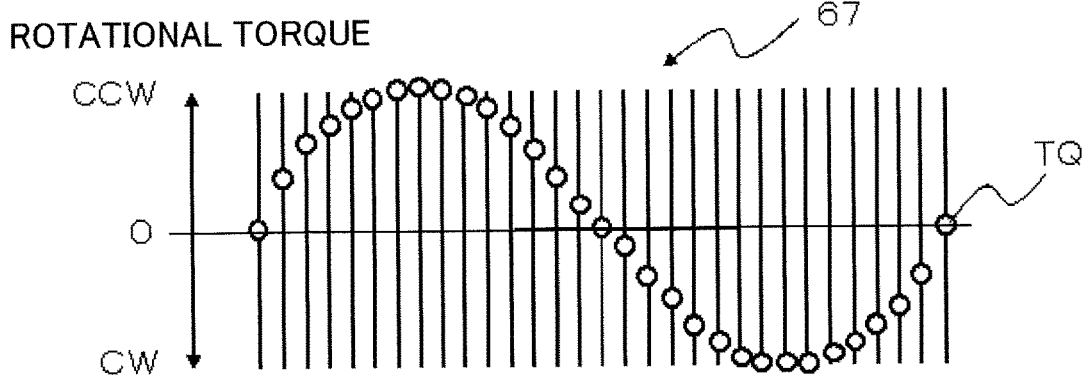
Figure 7A:
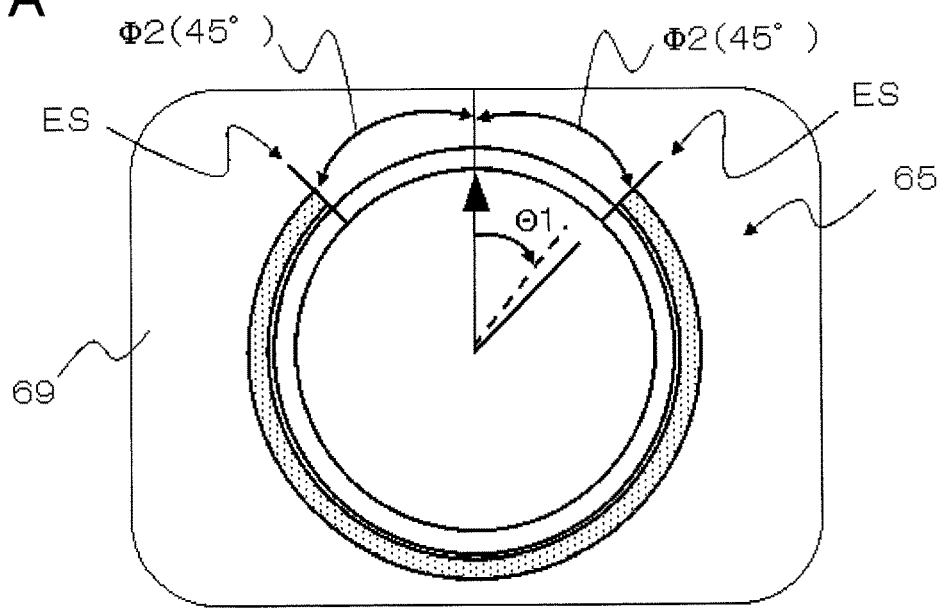
FIGS. 7A-7C are diagrams showing trajectories of changes in the braking force and an operation torque when control is performed only based on information on a rotation angle.
Figure 7B:
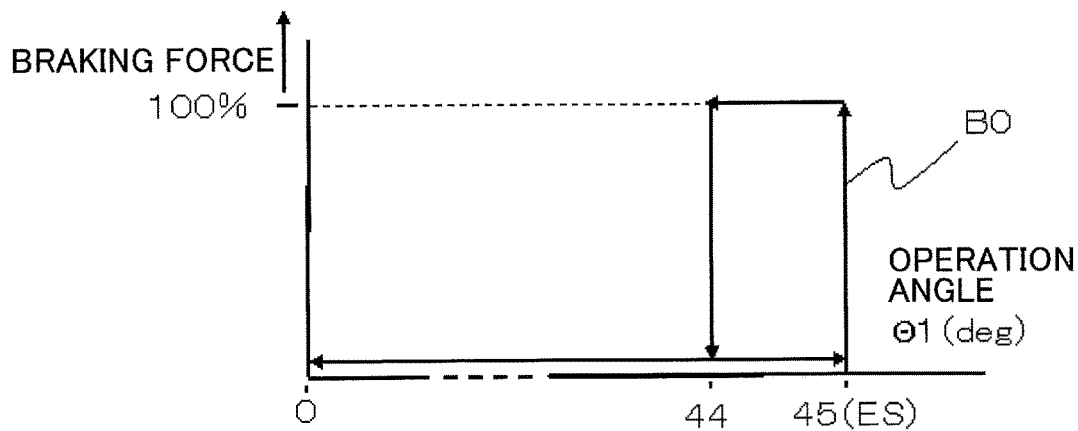
Figure 7C:
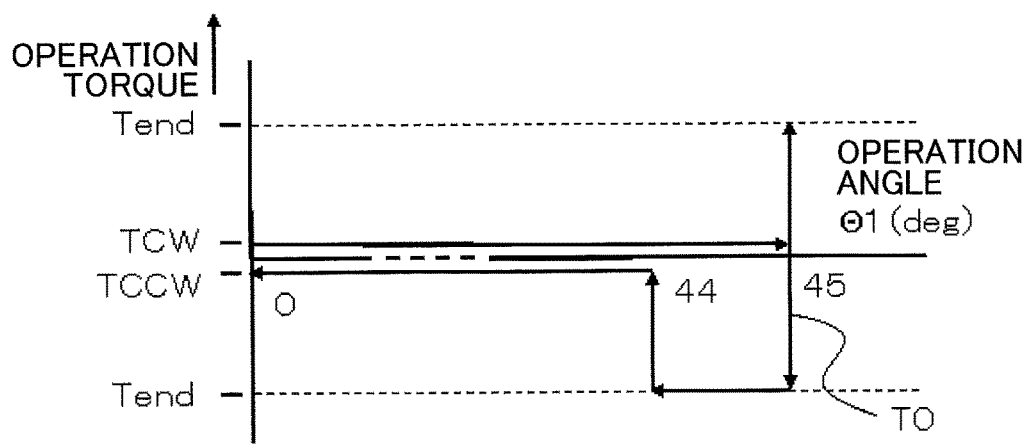
Figure 8A:
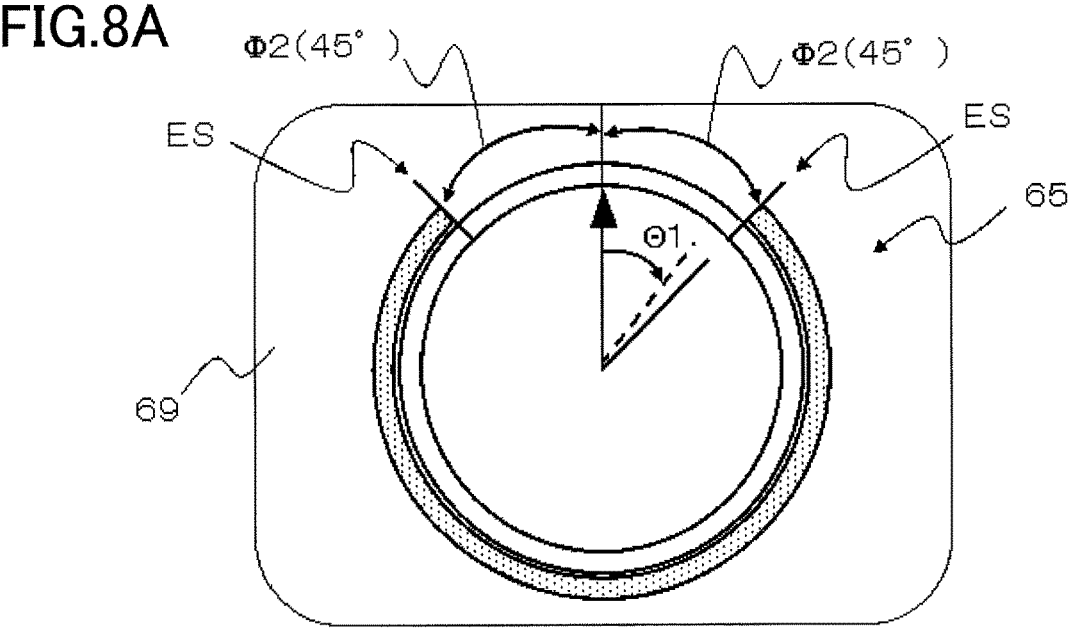
FIGS. 8A-8C are diagrams showing trajectories of changes in the braking force and the operation torque when control is performed based on information on a rotation angle and information on the operation torque.
Figure 8B:
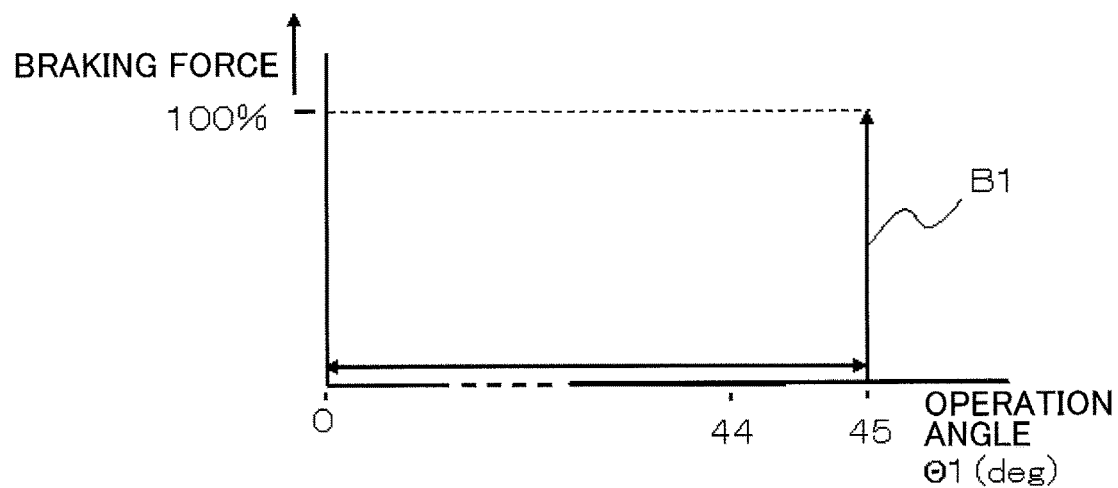
Figure 8C:
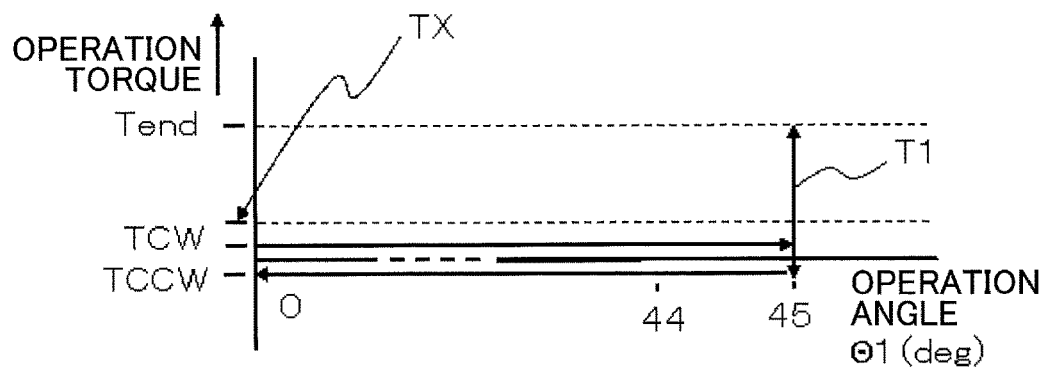

In the following, operations of the operation feel imparting type input device 100 will be described with reference to FIGS. 6A to 8C. FIGS. 6A-6C are diagrams showing setting operations for setting up a braking force BK and a rotational torque TQ. FIG. 6A shows a divided angle setting screen 65, FIG. 6B shows a brake setting screen 66, and FIG. 6C shows a torque setting screen 67. FIGS. 7A-7C are diagrams showing the trajectories of changes in a braking force B0 and an operation torque T0 in the vicinity of an endstop position ES in a case where the braking force B0 is controlled only based on information on the rotation angle obtained from the rotation angle detection unit 20, without using information on the operation torque T0 obtained from the operation torque detection unit 70. FIGS. 8A-8C are diagrams showing the trajectories of changes in a braking force B1 and an operation torque T1 in the vicinity of the endstop position ES in a case where the braking force B1 is controlled using both information on the operation torque T1 obtained from the operation torque detection unit 70 and information on the rotation angle obtained from the rotation angle detection unit 20. Note that FIGS. 7A and 8A show the divided angle setting screen 65 including the endstop position ES, FIGS. 7B and 8B respectively show the braking force B0 and the braking force B1, and FIGS. 7C and 8C respectively show the trajectories of changes in the operation torque T0 and the operation torque T1.

FIGS. 6A-6C show example input screens displayed on the display 69 connected to the setting value input unit 55. A setting value is input using a keyboard device or some other input device provided in the setting value input unit 55.

In FIG. 6A, a divided angle setting screen 65 is displayed on the display 69 connected to the setting value input unit 55. By inputting a setting value to the divided angle setting unit 54 of the control unit 50 via the setting value input unit 55, a divided angle Φ1 corresponding to one unit of operation for feel control when the operation knob 17 is rotated can be set up.

The divided angle Φ1 may be freely set up, and in the example of the divided angle setting screen 62 shown in FIG. 6A, one rotation of the operation knob 17 attached to the rotating body 10 is evenly divided into 12, with each divided angle Φ1 set to 30 degrees. Note that the number of divisions within one rotation can be freely selected such as 6 or 24, for example. Also, the plurality of divided angles Φ1 do not have to be equal angles but may be set to different angles, for example. Further, the divided angle Φ1 may be only one angle. That is, the rotating body 10 may be configured such that it can only be rotated within the range of one divided angle Φ1, for example.

In addition to displaying the divided angle setting screen 65, the display 69 connected to the setting value input unit 55 also displays the brake setting screen 66 and the torque setting screen 67 as shown in FIGS. 6B and 6C.

In FIG. 6B, the brake setting screen 66 shows one divided angle Φ1 set up by the divided angle setting unit 54 (Φ1=30 degrees in the example shown in FIG. 6A) being further subdivided into 31 angles so that the magnitude of the braking force BK can be variably set up at each angular position of the 31 subdivided angles. Similarly, in FIG. 6C, the torque setting screen 67 shows one divided angle Φ1 set up by the divided angle setting unit 54 (Φ1=30 degrees) being further subdivided into 31 angles so that the direction and magnitude of the rotational torque TQ can be variably set up at each angular position of the 31 subdivided angles.

The setting examples shown in FIGS. 6B and 6C represent the braking force BK and the rotational torque TQ that are to change within one divided angle Φ1 when the operation knob 17 fixed to the operation shaft 11 is held by the hand of an operator and the rotation body 10 is rotated in the clockwise direction (CW).

In the brake setting screen 66 shown in FIG. 6B, the braking force BK is set to a predetermined magnitude at the start point and the end point of one divided angle Φ1 (Φ1=30 degrees), and the braking force BK is set to substantially zero or a very weak force over an intermediate period between the start point and the end point. The setting value of the braking force BK at each angular position indicated in the brake setting screen 66 is supplied from the brake setting unit 53 to the brake modulation unit 61 shown in FIG. 5. In turn, the PWM conduction unit 62 is controlled by the brake modulation unit 61 to determine the duty ratio of a pulsed control current to be supplied to the brake application coil 47.

As a result, a current of a predetermined magnitude is applied to the brake application coil 47 at the start point and at the end point of the one divided angle Φ1, and a braking magnetic field is induced by the brake application coil 47 to cause the magnetic powder in the magnetorheological fluid 45 arranged inside the gap 44 to form an aggregated structure or a bridge structure to thereby increase the rotation resistance of the rotating body 10. In the intermediate period between the start point and the end point of the divided angle Φ1, little current is applied to the brake application coil 47, and as such, a braking magnetic field is not induced. In this period, the viscosity of the magnetorheological fluid 45 does not increase, and the magnitude of the braking force BK applied to the rotating body 10 is substantially smaller than the braking force BK applied at the start point and at the end point.

In the torque setting screen 67 shown in FIG. 6C, the direction and magnitude of the rotational torque TQ is set up to change in a sinusoidal manner (along a sine curve) from the start point to the end point of the one divided angle Φ1 (Φ1=30 degrees).

At the start point and at the end point of the divide angle Φ1, the rotational torque TQ to be applied to the rotating body 10 is substantially zero. In the period from the start point of the divided angle Φ1 to the midpoint of the divided angle Φ1, a rotational torque TQ in the counterclockwise direction (CCW) (resistive torque) is to be applied to the rotating body 10, and the magnitude of the rotational torque TQ is set up to gradually change. On the other hand, in the period from the midpoint of the divided angle Φ1 to the end point of the divided angle Φ1, a rotational torque TQ in the clockwise direction (CW) (pulling torque) is to be applied to the rotating body 10, and its magnitude is set up to gradually change.

When the braking force BK is set up to change as shown in the brake setting screen 66 of FIG. 6B and the rotational torque TQ is set up to change as shown in the torque setting screen 67 of FIG. 6C, the operation feedback force, namely, the operation torque, to be imparted to the hand of the operator holding the operation knob 17 to rotate the rotating body 10 in the counterclockwise direction also changes accordingly.

When the rotating body 10 is rotated clockwise, at the start point of the divided angle Φ1, the braking force BK applied by the brake application unit 40 acts on the rotating body 10 such that the rotation resistance increases. When the operation knob 17 is slightly rotated thereafter, the braking force BK is released, but a resistance torque in the counterclockwise direction (CCW) is applied from the start point to the midpoint of the divided angle Φ1. After passing the midpoint of the divided angle Φ1, a pulling torque in the clockwise direction (CW) is applied, and at the end point of the divided angle Φ1, the braking force BK is applied once again.

As a result, while the rotating body 10 is rotated 360 degrees, the braking force BK intermittently acts on the rotating body 10 at each divided angle Φ1, and within each divided angle Φ1, a resistance torque and a pulling torque act on the rotating body 10 so as to provide an operation feel simulating the feeling of operating a rotary switch having mechanical contact points.

In the following, a divided angle setting example that is different from the divided angle setting example shown in FIGS. 6A-6C will be described with reference to FIGS. 7A-7C. As described above, the divided angle Φ1 and the number of divisions can be freely set up via the divided angle setting screen 65. Thus, for example, a center position in the divided angle setting screen 65 may be set up as a fulcrum and one divided angle Φ1 may be set up on each side (left side and right side) of the center position.

FIG. 7A shows an example in which the center angle (0°) in the divided angle setting screen 65 is set up as a start point, and one divided angle Φ2 is set up on each side, namely, the left side and the right side, of the start point. The divided angle Φ2 is set to 45°, and an angle range other than the range within ±45° (within 45° to the left and right sides) from the start point is set up as a non-rotatable range. As such, the positions at ±45° from the start point corresponding to the divided angles Φ2 on the left side and the right side are set up as endstop positions ES.

Thus, the braking force B0 in the present example is set up to change within the divided angle Φ2 in a similar manner as in the example shown in FIG. 6B. That is, the braking force B0 at its maximum force (100%) is applied at the start point and at the endstop position ES corresponding to the end point within the divided angle Φ2. Also, the braking force B0 is set up to be substantially zero at operation angles Θ1 between the start point and the end point. FIG. 7B shows the trajectory of change in the braking force B0 with respect to the operation angle Θ1, and FIG. 7C shows the trajectory of change in the operation torque T0 with respect to the operation angle Θ1.

As described above, FIGS. 7B and 7C show the trajectories of changes in the braking force B0 and the operation torque T0 in the case where the braking force B0 is controlled based only on information on the rotation angle obtained from the rotation angle detection unit 20 without using information on the operation torque T0 obtained from the operation torque detection unit 70.

The illustration of the trajectory of change in the braking force B0 shown in FIG. 7B includes an enlarged portion showing the braking force B0 in the vicinity (around ±1°) of the operation angle Θ1 of 44°. The illustration of the trajectory of change in the operation torque T0 in FIG. 7C includes a similar enlarged portion. Note that for the sake of convenience, the angle resolution is assumed to be 1°. That is, the braking force B0 is set up to act at a certain force within a 1°-range. Thus, the braking force B0 acts at the maximum force within the 1°-range from angle 44° to angle 45°.

When the operator rotates the operation knob 17 in the clockwise direction (CW), the braking force B0 is substantially zero until the operation angle Θ1 reaches a position immediately before the endstop position ES (45°) as shown in FIG. 7B, and the operation torque T0 is also the same value as a CW direction rotation friction torque TCW, which is substantially zero, as shown in FIG. 7C.

When the operation knob 17 is further rotated in the clockwise direction (CW) and the operation angle Θ1 reaches the endstop position ES (45°), the brake application unit 40 is controlled based on the information on the rotation angle (rotation angle 45°) input to the brake setting unit 53 of the control unit 50 by the rotation angle detection unit 20 shown in FIG. 5 such that the braking force B0 is raised to the maximum force (100%). Accordingly, the operation torque T0 applied to the hand of the operator is also changed to an endstop torque Tend corresponding to the maximum torque value in the clockwise direction (CW) as shown in FIG. 7C. As a result, the operator may be able to feel that the operation angle Θ1 of the operation knob 17 has reached the endstop position ES (45°).

Thereafter, when the operator tries to rotate the operation knob 17 in the counterclockwise direction (CCW), because the angle resolution is 1°, the braking force B0 at the maximum force (100%) is set up to act on the rotating body 10 from the endstop position ES (45°) to 44°. As such, the operator continues to feel the endstop torque Tend corresponding to the maximum torque value while rotating the operation knob 17 in the counterclockwise direction (CCW) from the endstop position ES (45°) to 44°.

Thus, between the above positions, the operator continues to feel an operation hindrance or a catching feeling when attempting to rotate the operation knob 17 in the counterclockwise direction (CCW). Note that even if the angle resolution is reduced to 0.1°, for example, so as to reduce the range within which the braking force B0 acts at the maximum force to the range from angle 44.9° to angle 45.0°, the pulling feel that will be felt by the operator will be substantially the same.

Thereafter, when the operator further rotates the operation knob 17 in the counterclockwise direction (CCW) and the operation angle Θ1 reaches 44°, the brake application unit 40 is controlled based on the information on the rotation angle (rotation angle 44°) input to the brake setting unit 53 of the control unit 50 by the rotation angle detection unit 20 such that the braking force B0 is reduced to substantially zero as shown in FIG. 7B. Accordingly, the operation torque T0 is also changed to the same value as a CCW direction rotation friction torque TCCW, which is substantially zero, as shown in FIG. 7C. From this point, the operation knob 17 can be rotated in the counterclockwise direction (CCW) under the above-described conditions.

As described above, in the case where the braking force B0 is controlled using only the information on the rotation angle obtained from the rotation angle detection unit 20 without using the information on the operation torque T0 from the operation torque detection unit 70, a catching feel is felt when the operation knob 17 is rotated in the counterclockwise direction (CCW) from the endstop position ES (45°), namely, when transitioning from an endstop state.

According to an aspect of the present invention, a measure is implemented to prevent the sensation of a catching feel when transitioning from such an endstop state. Specifically, the operation torque detection unit 70 for detecting the magnitude of the operation torque T1 applied to the rotating body 10 is provided, the brake application unit 40 is controlled based on information on the operation torque T1 obtained from the operation torque detection unit 70 and information on the rotation angle obtained from the rotation angle detection unit 20, and when the rotating body 10 is rotated from the endstop position ES, a brake is released according to the magnitude of the operation torque T1.

In the following, a divided angle setting example based on both information on the operation torque T1 and information on the rotation angle will be described with reference to FIGS. 8A-8C. As in the example shown in FIG. 7A, in the divided angle setting screen 65 shown in FIG. 8A, a center position is set up as the start point, and the divided angles Φ2 are set up on the left side and the right side of the center position. The divided angle Φ2 is set to 45°, and a range other than the range within 45° to the left and right from the start point is set up as a non-rotatable range. As such, the positions at 45° to the left and right from the start point corresponding to the divided angles Φ2 are set up as endstop positions ES.

Note that in the present embodiment, the divided angle Φ2 is set to 45°. However, the divided angle Φ2 does not necessarily have to be set to 45° and may be set to any value that does not exceed 180°. Also, note that the center position in the divided angle setting screen 65 does not have to be set up as the start point, and only the two endstop positions ES may be set up without setting the start point, for example.

In the present embodiment, the braking force B1 is applied at the endstop positions ES corresponding to the end points and the start point within the divided angle Φ2, and the braking force B1 is set to be substantially zero at the operation angles Θ1 between the start point and the end points. FIG. 8B shows the trajectory of change in the braking force B1, and FIG. 8C shows the trajectory of change in the operation torque T1 in the present case.

As in the case of FIG. 7B, the illustration of the trajectory of change in the braking force B1 shown in FIG. 8B includes an enlarged portion representing the braking force B1 for the operation angle Θ1 in the vicinity (around ±1°) of the angle of 44°. The same applies to the illustration of the operation torque T1 shown in FIG. 8C. Also, note that the angle resolution is assumed to be 1°.

When the operator rotates the operation knob 17 in the clockwise direction (CW), the braking force B1 is substantially zero until the operation angle Θ1 reaches a position just before the endstop position ES (45°) as shown in FIG. 8B, and the operation torque T1 is also the same value as the CW direction rotation friction torque TCW, which is substantially zero, as shown in FIG. 8C.

Then, when the operation knob 17 is further rotated in the clockwise direction (CW) and the operation angle Θ1 reaches the endstop position ES (45°), the brake application unit 40 is controlled based on the information on the rotation angle (rotation angle 45°) input to the brake setting unit 53 by the rotation angle detection unit 20 shown in FIG. 5, and the braking force B1 is raised to the maximum force (100%) as shown in FIG. 8B. Accordingly, the operation torque T1 applied to the hand of the operator is also changed to the endstop torque Tend corresponding to the maximum torque value in the clockwise direction (CW) as shown in FIG. 8C. As a result, the operator may be able to feel that the operation angle Θ1 of the operation knob 17 has reached the endstop position ES (45°).

As described above, in the operation feel imparting type input device 100, the magnitude of the operation torque T1 is constantly detected by the torque sensor 71 in the operation torque detection unit 70. That is, as shown in FIG. 5, the detected operation torque T1 is constantly output from the operation torque detection unit 70 and is passed through the A/D conversion unit 75 and the operation torque calculation unit 76 to be constantly input to the brake setting unit 53 of the arithmetic unit 51 included in the control unit 50. The magnitude of the operation torque T1 input to the brake setting unit 53 is constantly compared with the magnitude of an operation torque TX having a predetermined value, and brake control is performed according to the magnitude of the operation torque T1.

In the brake setting unit 53, the magnitude of a current to be supplied to the brake application coil 47 of the brake application unit 40 can be set up according to the magnitude of the operation torque T1, and the magnitude of the braking force B1 can be changed accordingly.

Even when the operator tries to rotate the operation knob 17 in the counterclockwise direction (CCW) after the operation angle Θ1 of the operation knob 17 operated by the operator has reached the endstop position ES, the magnitude of the operation torque T1 input to the brake setting unit 53 continues to be compared with the magnitude of the operation torque TX in the arithmetic unit 51 of the control unit 50. In the present embodiment, brake control is implemented so that an endstop state is not maintained unless the magnitude of the operation torque T1 input to the brake setting unit 53 is greater than or equal to the magnitude of the operation torque TX. In other words, the brake is released unless the operator continues to rotate the operation knob 17 in the clockwise direction (CW) even after the operation angle Θ1 reaches the endstop position ES.

Accordingly, when the operator tries to rotate the operation knob 17 in the counterclockwise direction (CCW) from the endstop position ES, the brake (endstop state) is released. Thus, once the operation angle Θ1 of the operation knob 17 falls below 45°, the braking force B1 becomes substantially zero as shown in FIG. 8B irrespective of the value of the operation angle Θ1, namely, even if the operation angle Θ1 is greater than 44°. The operation torque T1 also returns to the same value as the CCW direction rotation friction torque TCCW, which is substantially zero.

As a result, even when the operator tries to rotate the operation knob 17 in the counterclockwise direction (CCW) from the endstop position ES, the operator would not feel a catching feel.

As described above, by detecting the operation torque T1 and setting the braking force B1 according to the magnitude of the operation torque T1, a catching feel may not be felt when the operation knob 17 is rotated in the counterclockwise direction (CCW) from the endstop position ES (45°), namely, when transitioning from the endstop state.

In the following, effects of the present embodiment will be described.

In the operation feel imparting type input device 100 according to the present embodiment, the rotating body 10 is controlled by the brake application unit 40 and the torque application unit 30, and in this way, a resistive feel and a pulling feel may be suitably imparted to the operator operating the operation knob 17. Also, because a brake is released at an endstop according to the magnitude of the operation torque T1, the generation of a catching feel when transitioning from an endstop state may be prevented.

Also, because brake control is performed using the magnetorheological fluid 45, a natural operation feel may be imparted to the operator during operation.

Further, because the brake application unit 40 is controlled based on information on the rotation angle and information on the operation torque that are constantly detected, accurate brake control may be performed.

In the following, further aspects of the present invention will be described.

An operation feel imparting type input device according to an aspect of the present invention includes a fixed part, a rotating body rotatably supported by the fixed part, a rotatable operation knob fixed to the rotating body, a rotation angle detection unit configured to detect a rotation angle of the rotating body, a brake application unit configured to apply a braking force to the rotating body, a torque application unit configured to apply a torque to the rotating body, a control unit configured to control the brake application unit and the torque application unit, and an operation torque detection unit configured to detect the magnitude of an operation torque applied to the rotating body. When the rotating body is rotated from an endstop, brake release is performed according to the magnitude of the operation torque.

In the operation feel imparting type input device having the above-described configuration, the rotating body is controlled by the brake application unit and the torque application unit, and in this way, a resistive feel and a pulling feel can be imparted to an operator operating the operation knob. Also, a brake is released at an endstop according to the magnitude of the operation torque, and in this way, the generation of a catching feel when transitioning from an endstop state can be prevented.

Also, according to a further aspect of the present invention, the brake application unit includes a rotating plate provided in the rotating body, a magnetorheological fluid arranged inside a gap between the fixed part and the rotating plate, and a brake application coil configured to apply a magnetic field to the magnetorheological fluid; and the brake release is performed by controlling a current applied to the brake application coil.

In the operation feel imparting type input device having the above-described configuration, brake control is performed using the magnetorheological fluid, and in this way, a natural operation feel may be imparted to the operator operating the operation knob.

Also, according to a further aspect of the present invention, the control unit includes a brake setting unit, information on the rotation angle obtained by the rotation angle detection unit and information on the operation torque obtained by the operation torque are input to the brake setting unit, and the brake application unit is controlled based on the information on the rotation angle and the information on the operation torque input to the brake setting unit.

In the operation feel imparting type input device having the above-described configuration, information on the rotation angle and information on the operation torque are constantly detected to control the brake application unit, and in this way, brake control may be accurately performed.

Note that although the present invention has been described above with respect to illustrative embodiments, the present invention is not limited to the above-described embodiments, and various modifications and changes may be made without departing from the scope of the present invention.

What is claimed is:

1. An operation feel imparting type input device comprising:
    a fixed part;
    a rotating body rotatably supported by the fixed part;
    a rotatable operation knob fixed to the rotating body;
    a rotation angle detection unit configured to detect a rotation angle of the rotating body;
    a brake application unit configured to apply a braking force to the rotating body;
    a torque application unit configured to apply a torque to the rotating body;
    a control unit configured to control the brake application unit and the torque application unit; and
    an operation torque detection unit configured to detect a magnitude of an operation torque applied to the rotating body;
    wherein when the rotating body is rotated from an endstop, brake release is performed according to the magnitude of the operation torque.

2. The operation feel imparting type input device according to claim 1, wherein
    the brake application unit includes a rotating plate provided in the rotating body, a magnetorheological fluid arranged inside a gap between the fixed part and the rotating plate, and a brake application coil configured to apply a magnetic field to the magnetorheological fluid; and
    the brake release is performed by controlling a current applied to the brake application coil.

3. The operation feel imparting type input device according to claim 2, wherein
    the control unit includes a brake setting unit;
    information on the rotation angle obtained by the rotation angle detection unit and information on the operation torque obtained by the operation torque are input to the brake setting unit; and
    the brake application unit is controlled based on the information on the rotation angle and the information on the operation torque input to the brake setting unit.

4. The operation feel imparting type input device according to claim 3, wherein
    the control unit includes a divided angle setting unit; and
    the brake application unit is controlled to apply an endstop braking force for the endstop to the rotating body at a start point and at an end point of a divided angle set up by the divided angle setting unit.

5. The operation feel imparting type input device according to claim 1, wherein
    the control unit includes a divided angle setting unit; and
    the torque application unit is controlled to apply a resistive torque or a pulling torque to the rotating body from a start point to an end point of a divided angle set up by the divided angle setting unit based on information on the rotation angle obtained from the rotation angle detection unit, the resistive torque being in an opposite direction of a rotating operation direction and being applied to the rotating body from the start point to a midpoint of the divided angle, and the pulling torque being in the same direction as the rotating operation direction and being applied to the rotating body from the midpoint to the end point of the divided angle.

6. The operation feel imparting type input device according to claim 5, wherein
    a torque direction and a torque magnitude of the torque to be applied by the torque application unit are set up to change in a sinusoidal manner from the start point to the end point of the divided angle.

7. The operation feel imparting type input device according to claim 1, wherein
    the rotatable operation knob and the rotating body are configured to integrally rotate with respect to a detection accuracy of the rotation angle obtained by the rotation angle detection unit.

* * * * *